No. 877,508. PATENTED JAN. 28, 1908.
H. A. KLEMM.
SEWING MACHINE.
APPLICATION FILED DEC. 30, 1904.

WITNESSES:
L. Almquist
C. Sedgwick

INVENTOR
Hermann A. Klemm
BY
A. D. Harger,
ATTORNEY

No. 877,508. PATENTED JAN. 28, 1908.
H. A. KLEMM.
SEWING MACHINE.
APPLICATION FILED DEC. 30, 1904.

WITNESSES:

INVENTOR
Hermann A. Klemm
BY
A. P. Thayer
ATTORNEY

No. 877,508. PATENTED JAN. 28, 1908.
H. A. KLEMM.
SEWING MACHINE.
APPLICATION FILED DEC. 30, 1904.

WITNESSES:
L. Almquist
C. Bedquist

INVENTOR
Hermann A Klemm
BY
H. A. Thayer
ATTORNEY

UNITED STATES PATENT OFFICE.

HERMANN A. KLEMM, OF NEW YORK, N. Y., ASSIGNOR TO THE SINGER MANUFACTURING COMPANY, A CORPORATION OF NEW JERSEY.

SEWING-MACHINE.

No. 877,508.   Specification of Letters Patent.   Patented Jan. 28, 1908.

Application filed December 30, 1904. Serial No. 238,886.

*To all whom it may concern:*

Be it known that I, HERMANN A. KLEMM, a citizen of the United States of America, and a resident of the borough of Bronx, New York city, and State of New York, have invented certain new and useful Improvements in Sewing-Machines, of which the following is a specification.

My invention relates to improvements in sewing machines and consists essentially of improved means for first sewing two pieces of fabric together side by side along one edge, means for opening the pieces along one side of the seam, also means covering said seam with a seam designed for more substantially sewing cut knit goods, as hereinafter described reference being made to the accompanying drawings in which:—

Fig. 3ª, is a side view of the feed bar for the first seaming mechanism, detached. Fig. 4ª is a view in elevation showing the standard for sustaining the needle bar for the joining seam mechanism and a fragment of the adjacent end of said bar. Fig. 6, is a horizontal section in the plane of the main shaft and also enlarged as to the scale of the drawing.

The apparatus practically comprises two sewing machines in one having one set of stitch forming and feed elements for joining the two pieces of fabric, and another set of covering seam forming and feed elements, both sets being operative at the same time, for finishing the joining seam with a covering seam which reinforces the joining seam and at the same time flattens down and binds and smooths the raw edges of the said seam in a manner to produce superior and more satisfactory work.

In the finishing of garments made of knit goods, in which the meeting or crossing of two or more seams frequently occurs, it is necessary in many cases to have the uniting and covering stitching mechanisms so related that they may be operated singly for a short distance adjacent the junction of the converging seams, and the present machine is therefore designed for such mode of operation by the provision of independent supporting means for the fabric which are spaced slightly apart and each adapted to act with its respective stitching mechanism, whereby the fabric may be readily guided intermediate the same in passing from the primary or to the secondary stitching mechanism, when required.

In the stitching of materials, especially of soft or sleazy character, such as knitted fabrics, it is of great importance that the feeding members be arranged suitably for engagement of the fabric over the area of the same within which the line or lines of stitching is or are applied, and particularly as regards the initial uniting operation, for the reason that prior to its reinforcement by the initial line or lines of stitches the action of the feeding devices, if applied to the fabric, laterally of the line of seam and only on one side thereof, as in a certain prior construction, will cause the dragging of the overlapped marginal portions of the material from between the necessary edge-supporting guides, so as to disarrange such overlapped edges and prevent the proper action thereon of the stitching devices. By the present invention, the feeding devices are so constructed and arranged as to obviate such liability, each acting upon the fabric in a plane transversely of its respective needle path, while the primary feeding members are also arranged to advance the overlapped layers or plies of fabric to the primary stitching mechanism flatwise while permitting them to remain face to face in contact relation, whereby such overlapped layers are readily introduced into the machine by the operator, and the interlock of their fibers inside and adjacent the line of seam produces a strong tendency against disarrangement of the edges in the feeding and stitching operations to which they are liable in the operation of the prior construction referred to involving the employment of a continuous supporting member in conjunction with the two stitching mechanisms by which the body of the fabric inside the line of seam is necessarily opened out for its initial introduction into the machine.

The joining seam elements are placed in advance of the covering seam elements and so far as their seaming properties are concerned may comprise any approved form of such elements as may be adapted for use in connection with the covering seam elements, but what I have chosen in this example for illustration may consist of a pair of feeding disks $a$ mounted on vertical bearing bosses $b$ carried by the bracket-pieces $f^x$ depending from the head of the bracket-arm for feeding the two pieces of work $c$ to be sewed placed upright edgewise between the coacting faces of said disks, a horizontally or practically horizontally operating needle $d$, a looping hook $e$, and loop spreader $f$ of usual construction and operation which need not be particularly described so far as their stitch forming operations are concerned, it being understood that they make the ordinary needle and looper thread chain stitch.

The feed disks are operated by a pawl mechanism whereof the pendent flange $g$ of one of the feed disks is a part operated by the connecting rod $h$ and the crank $i$ of the main shaft $j$, and the other of the feed disks is operated by the frictional contact with it of the one impelled by the ratchet device.

The ratchet device comprises the pawl $g'$ horizontally rocking on the vertical axis $g^2$ and having the internal eccentric faces $g^3$ fronting the inner face $g^4$ of the vertical flange $g$, between which faces $g^3$ and $g^4$ ball races are formed for clutch balls $g^5$, which with controlling springs $g^6$ behind them cause the balls to bite said inner flange $g^4$ and turn the feed disk when feed bar $h$ shifts forward, and the stationary eccentric face $g^7$ making with said flange $g^4$ another ball race in which is a ball $g^8$, and a controlling spring $g'$ having reverse action relatively to the other described ball races and balls to grip and hold the feed disk when the feed bar reverses and prevent reverse action of the feed disk, but this is not a new pawl mechanism and is only detailed here for clearer understanding of the means of operating the feed disks.

The needle $d$ is carried on the lower horizontally and forwardly projecting arm $k$ of a mainly vertically ranging bar $l$ which is at its upper end $m$ pivoted on a standard $n$ supported on the head 19 of the stationary arm 20, directly over the seam line, and intermediately of its extremities is clamped to the front end of a horizontal arm $o$ mounted laterally and upwardly slidable in a guide-way $p$ and connected by the eccentric rod $q$ with the eccentric $r$ on the horizontal shaft $s$, in the upper part of the stationary overhanging bracket-arm $t$ of the frame and geared by bevel wheels $t'$, upright shaft $u$ and bevel wheel $v$ with the main shaft $j$ for imparting the reciprocating movements to the said needle $d$; $l'$ is a guide bracket slotted at the lower end for guiding bar $l$. The looping hook $e$ coacting with said needle $d$ is carried on the lower extremity of the upwardly and backwardly inclined oscillating shaft $w$ carried in the bearing $x$ supported by the bracket $y$ and having the toothed pinion $z$ with which a reciprocating toothed rack 2 gears, said rack being carried by a staff 3 sliding in the bearing 4 and coupled to one arm of a bell crank 5 having a supporting pivot at 6 and connected by its other arm and the rod 7 to the wrist pin 8 of a disk 9 geared by the bevel wheels 10 with the shaft $s$.

The loop spreader $f$ is arranged as a vertical piece having the operative point on its lower end and carried by the horizontal arm 11 of the vertically reciprocating rod 12 supported in brackets $12^a$ and coupled by the clamp 13 and link 14 with the crank 15 of the rock shaft 16 mounted in bearings 17, one of which is supported on the bracket 22 bolted on the hub 23 of the rear side of the stationary arm supporting standard 24; the other bearing 17 being on one side of head $t$. The rock shaft 16 is coupled by another crank 25 and eccentric rod 26 with an eccentric 27 on the main shaft $j$, for operating it.

The foregoing described devices constitute the seaming mechanism by which the joining of the pieces is effected in advance of the making of the covering seam directly following the joining, the apparatus of which will now be described, but it is to be understood that I do not limit myself to overedge seaming mechanism for joining the pieces.

Figures 7, 9, 11:
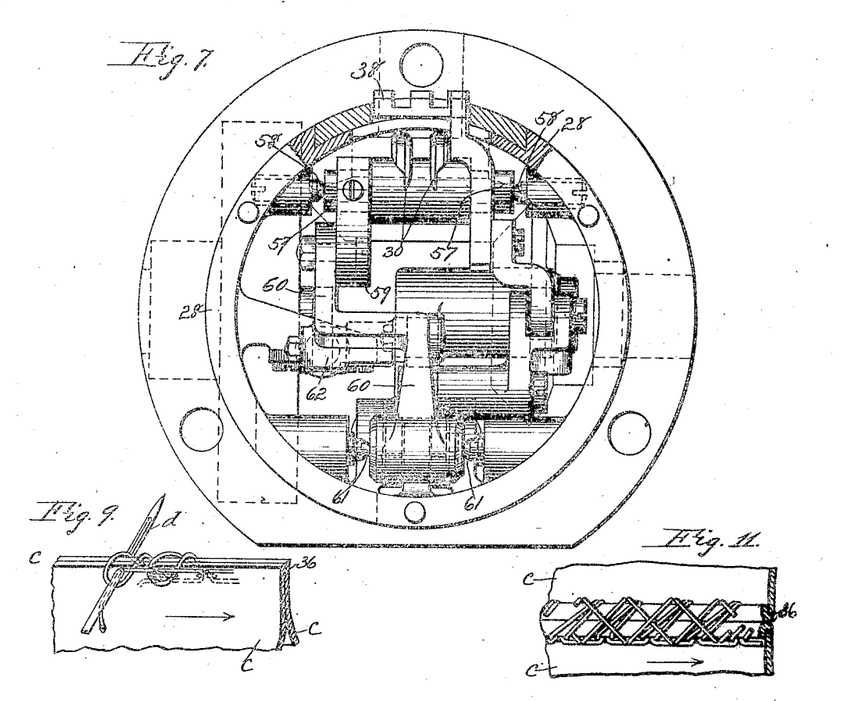
Fig. 7, represents parts in end elevation of the cylindrical part of the machine also enlarged as to the scale of the drawing.
Fig. 9, is a perspective view of two pieces of work in illustration of the first seam.
Fig. 11, is a face view of two pieces of work showing the covering seam.
Figures 8, 10, 12:
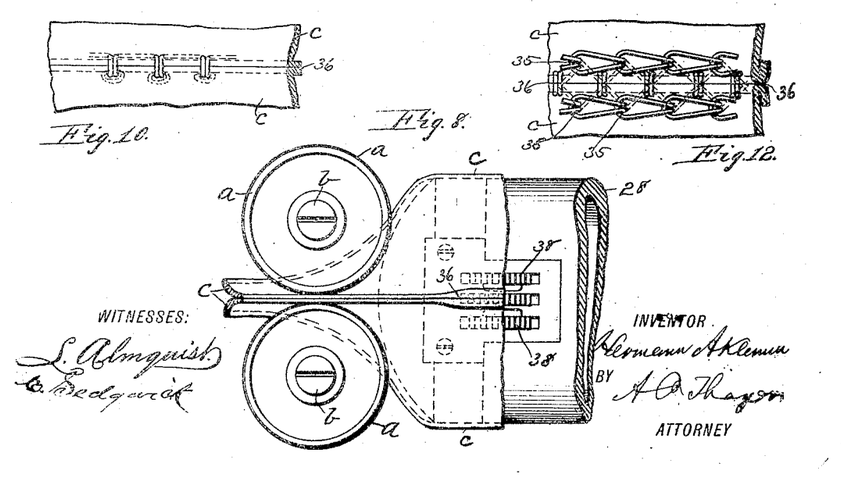
Fig. 8, represents details in plan view and also drawn to the enlarged scale.
Fig. 10, is a plan view of two pieces of work showing the finish of the said seam.
Fig. 12, is a plan view of the underside of the work showing the covering seam and the overedge seam.
Figures 12, 13:
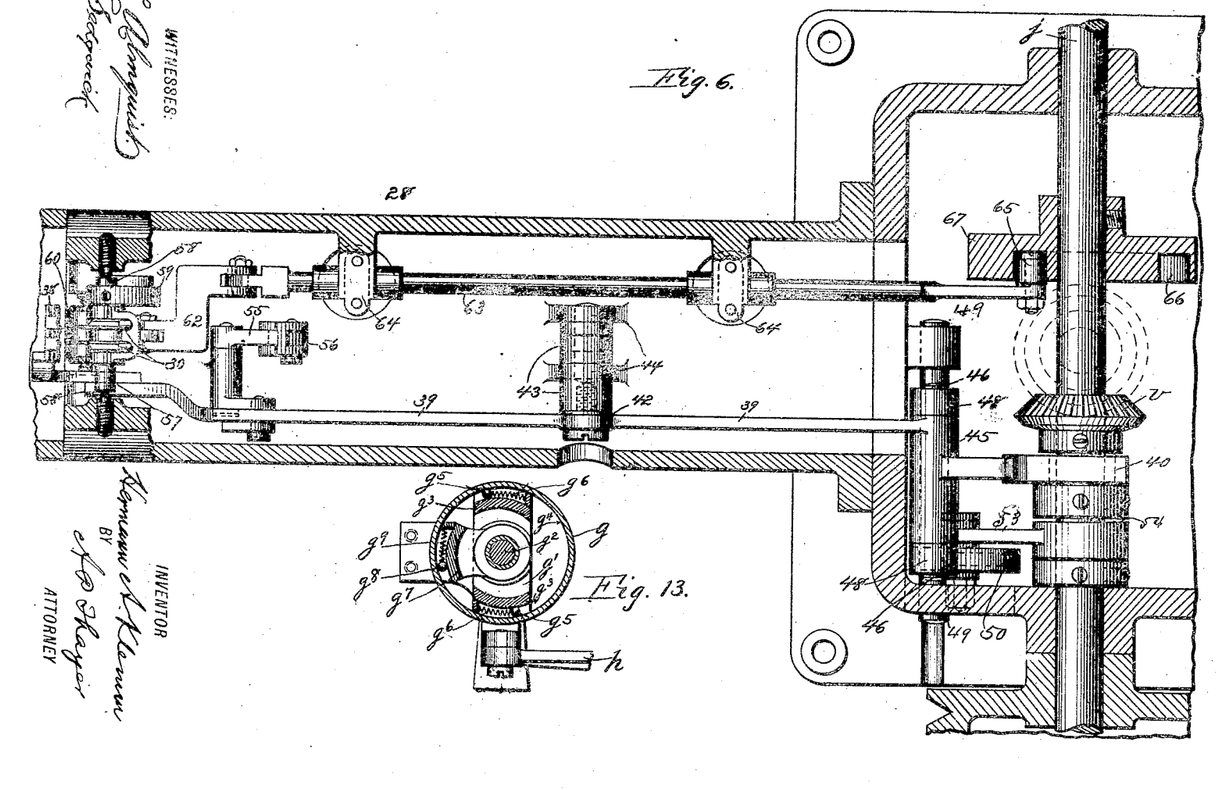
Fig. 13, is a horizontal section of part of the ratchet mechanism for operating the feed devices of the first seaming elements, the section being taken on line 13—13 of Fig. 1.

From the feeding disks $a$ of the joining mechanism the seamed fabrics $c$ pass on to the front end of the cylindrical work plate or work-supporting horn 28 and are thereby divided below the stitches as shown in Fig. 8 and have the lap 36 pressed down by the presser foot 37 so as to be sewed each side of the line of the joining seam for making a flat seam, two vertically reciprocating needles 29, and two single thread chain stitch forming hooks 30 being used, the needles being attached to a single needle bar 31 located above the work plate so as to reciprocate in bearings 32, and the hooks being located under the work plate on a rocking shaft 57 arranged transversely of the seam line, and said hooks being arranged for coaction with the needles respectively and in the usual manner of such needle and hook devices for making chain stitches 35. The needle bar 31 carrying the two needles vertically is also rotatable in its bearings 32 to the extent of half a revolution for crossing the threads on the upper side of the work and covering the joining seam as shown in Figs. 11 and 12 by double zig-zag threads. A feed dog 38 having the usual four motion action is employed for feeding the work to these needles 29 and passing it along from the needles as usual. This feed dog is attached to the forward extremity of a bar 39 located within the cylinder 28 and reaching along backward through it and connected by sleeve 45 with a fork 40 embracing the eccentric cam 41 on the main shaft $j$ to give the up and down movements to the feed dog, said bar being pivoted at 42 to an intermediate standard 43 on which it vibrates for such vertical motion of the feed dog.

For the forward and backward motion of the feed dog, the standard 43 is pivoted at 44 and the sleeve 45 has a rod 46 engaging slots 47 in the upper portions of rocking standards 48 carried on a rock shaft 49 on which is an arm 50 in the upper portion of which is a slot 51 wherein a pin 52 of a connecting rod 53 engages to rock shaft 49 by the action of an eccentric 54 on the main shaft $j$ with which rod 53 is connected, thus imparting the said reciprocating movements to the feed bar 39 and dog 38. The pin 52 connects with arm 50 by the slot 51, as a means of adjustment for varying the lengths of the stitches.

Intermediately of the standard 48 and the end of the feed bar 39 carrying the feed dog 38, said bar is coupled by a pair of toggle jointed links 55, one of which has a pivot 56 fixedly mounted in the cylinder 28, which are so arranged relatively to said bar that they give more positive operation to the feed dog in its up and down movements.

For the rocking movements of the looping hooks 30 they are carried on a short rock shaft 57 pivoted on centers 58 and having a short arm 59 coupled to a rock lever 60 pivoted in centers 61, and coupled by a link 62 with a reciprocating rod 63 mounted in bearings 64 within the cylinder or horn 28 and extending backward to engagement by a stud 65 with a cam slot 66 in a disk 67 carried on the main shaft $j$.

The needle bar 31 is operated vertically by the crank pin 68 carried by the disk 69 on the shaft $s$, connecting rod 70, perforated block 71 carried by said connecting rod and the fixed collars 72 on the needle bar and between which the said perforated block works.

Figure 5:
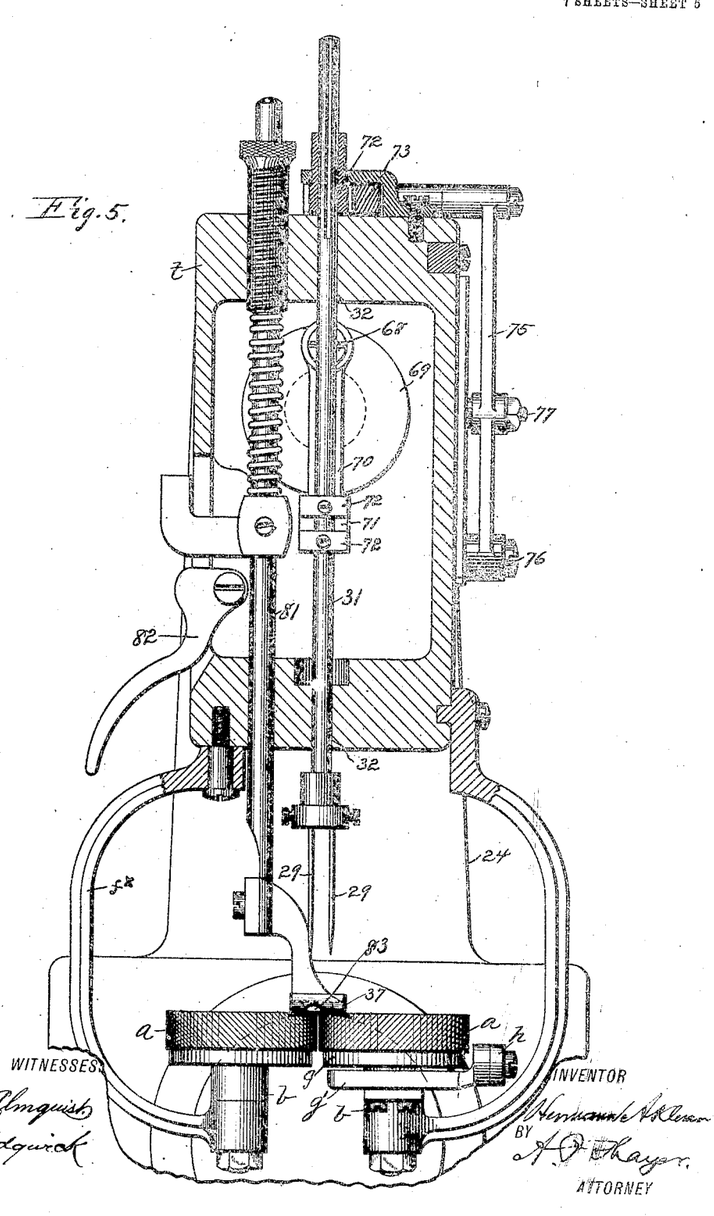
Fig. 5, is a vertical section of some of the parts on line 5—5 of Fig. 1, also enlarged.

The rotatory motion of the needle bar 31 is effected by the pinion 72 spline keyed on said bar as best shown in Fig. 5, and the reciprocating toothed rack 73 geared with said pinion and carried on the reciprocating rod 74 coupled with the rock lever 75 having a fulcrum pivot 76 and carrying a stud 77 working in the cam groove 78 of a disk 79 geared by bevel wheels 80 with the shaft $s$, said wheels being in the proportions of one to two because the needle bar must make only half a turn while making a full cycle up and down.

Figure 1:
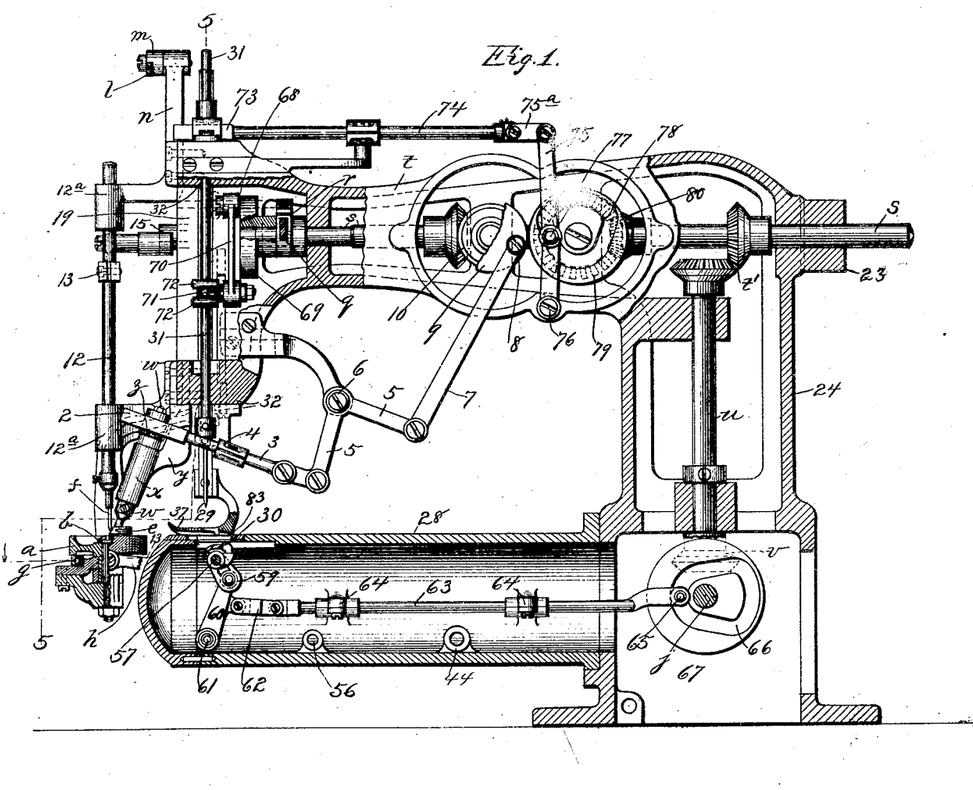
Figure 1, is partly a side elevation and partly a vertical section.
Figure 2:
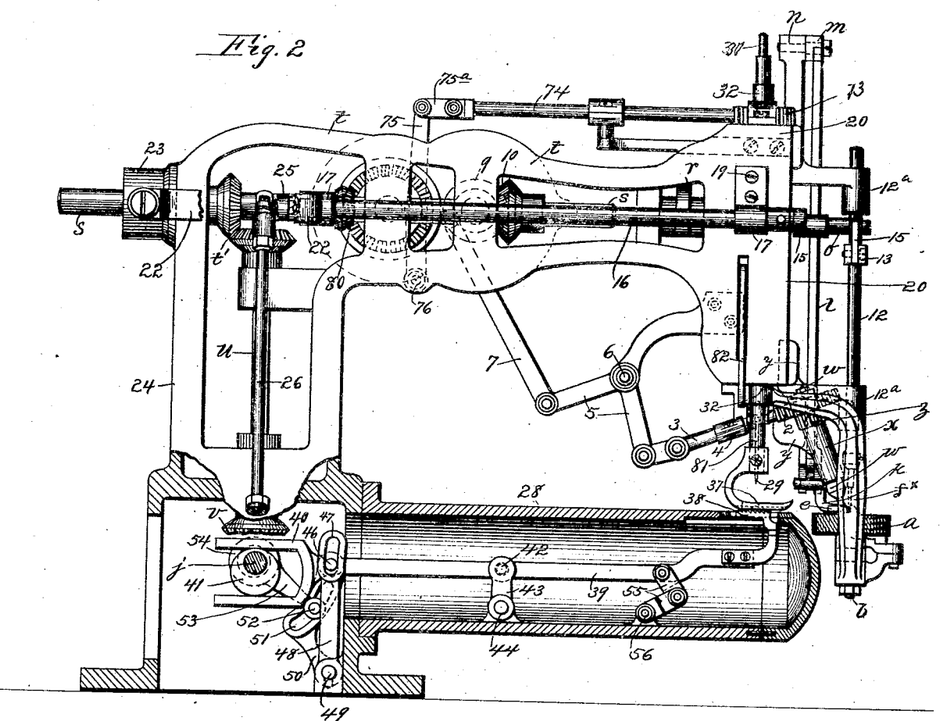
Fig. 2, is partly a rear side elevation and partly a vertical section.
Figures 3, 3A:
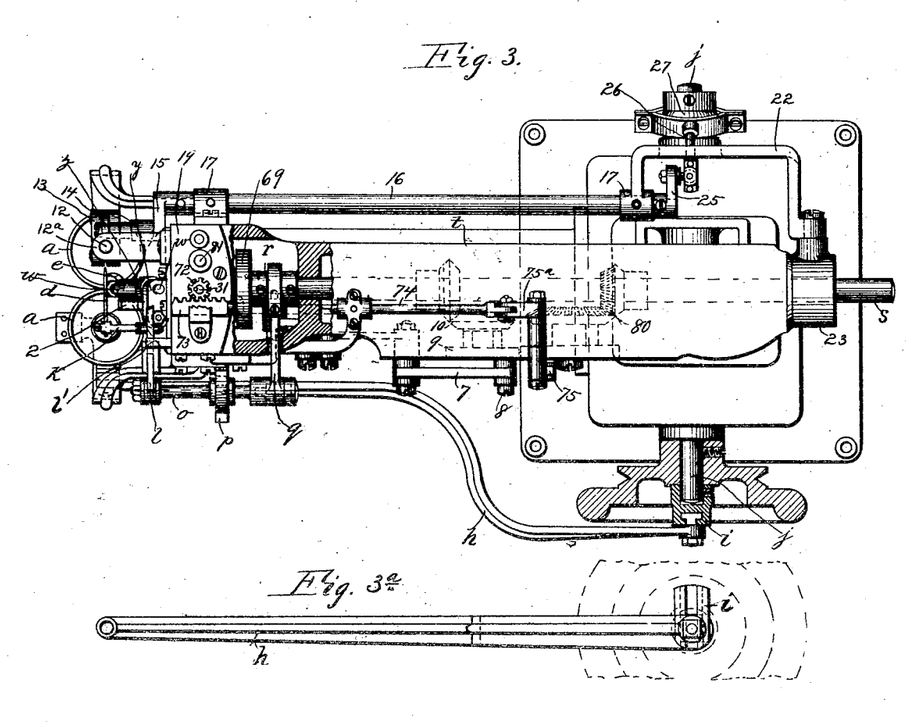
Fig. 3, is a plan view with some parts in horizontal section.

The presser foot 37 is carried on the usual presser bar 81 and has the usual cam lever lifter 82. In the under face of the presser foot is a groove 83 for the joining seam, said groove, preferably, being prominent at the front but shallowing backward and vanishing in the flat surface as shown in Fig. 1 for ultimately flattening the seam more effectually.

It will be seen that an especial advantage of the independent feed mechanisms for each set of stitch forming elements is the facility it affords of adjusting them with relation to each other for compensating action in the way of regulating the feeds one to the other for giving either faster or slower feed by either one as the nature of the goods may require for making smooth and even seams, either by crowding the feed of one against the other in case slight overfeed of the first acting feed is necessary or retarding it.

Figures 4, 4A:
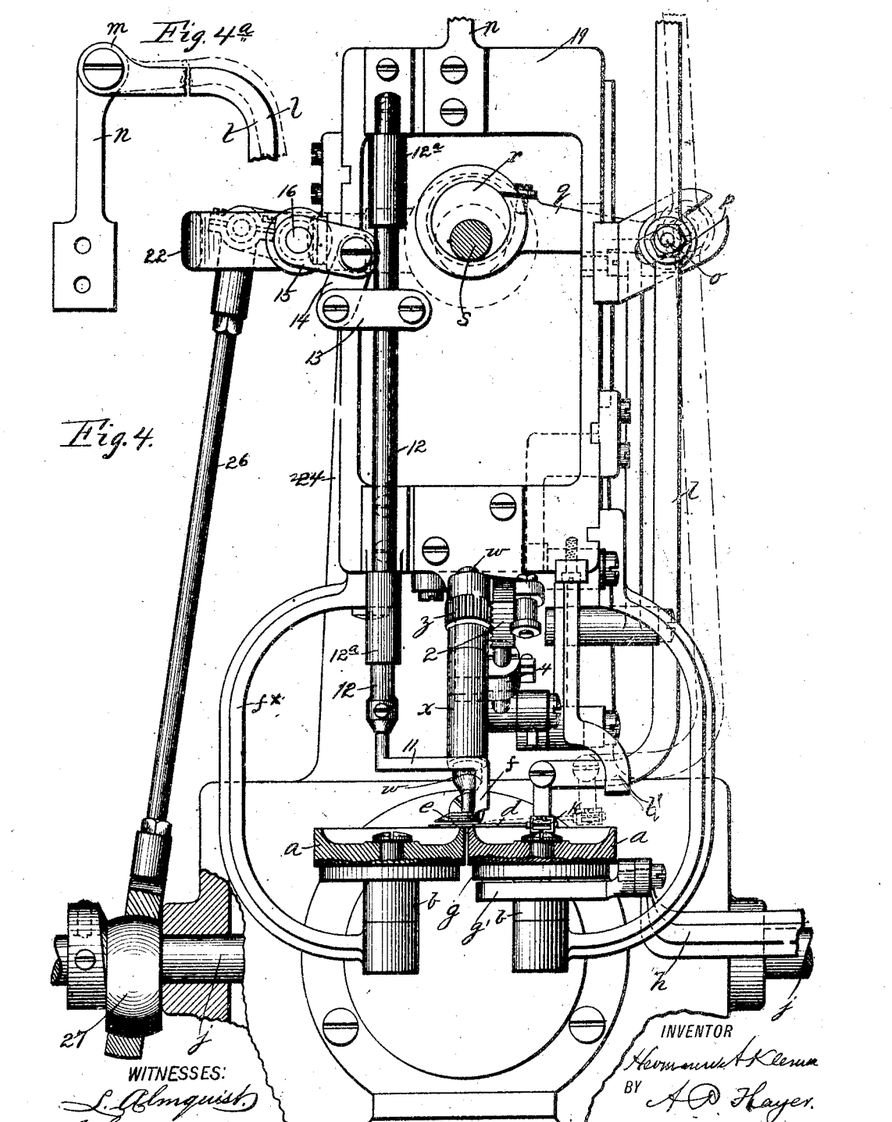
Fig. 4, is an elevation as seen from the left hand of Fig. 1, on a larger scale and with some parts in vertical section.

By reference to the drawings, and more particularly to Fig. 4, it will be observed that the bracket-pieces $f^\times$ constitute work-supporting portions of the bracket-arm to which they are attached, and afford a clear and unobstructed vertical work-receiving space in front of the central portion of the work-supporting horn 28 through which the work, hanging from the feed rolls $a$ carried thereby, passes to and over the work-supporting horn in the stitching operation. By the construction of the machine frame in this form, the overlapped pieces of fabric are adapted to hang from the feed rolls throughout their marginal and body portions in face-to-face contact relation which is undisturbed by passage through the machine until the uniting stitches have been applied so as to insure against their relative longitudinal or lateral displacement while undergoing the stitching operation.

I do not limit myself to zig-zag cross seaming mechanisms for the finishing seam for it is evident that other cross seaming means may be employed, but I consider the zig-zag stitches the best because there is more uniform distribution of the crossing threads.

What I claim as my invention is.—

1. In a sewing machine, the combination with the frame comprising a work-supporting horn, an overhanging bracket-arm and a work-supporting member in advance of said work-supporting horn having an unobstructed vertical work-receiving opening in line with the central portion and throughout the depth of said work-supporting horn, of work-advancing mechanism carried by said work-supporting member and adapted for the suspension and propulsion of the work through said opening toward said horn, feeding mechanism carried by said horn and adapted to propel the work upon and longitudinally of said horn, and two sets of stitch-forming mechanism acting in conjunction respectively with said work-advancing and feeding mechanisms.

2. In a sewing machine, the combination with independent stitch-forming mechanisms adapted respectively for uniting and covering the overlapped margins of layers of fabric, of means for supporting and advancing to said uniting stitch-forming mechanism said layers of fabric with both the margins and body portions of the latter in face-to-face contact relation, and including initially acting opposed propelling means moving in unison and engaging the opposite faces of the work so disposed adjacent the initial stitching line, and means intermediate the stitch-forming and work-advancing mechanisms for turning outwardly upon opposite sides of and above the line of stitching the marginal portions of the fabric so as to overlap the adjacent body portions thereof.

3. In a sewing machine, the combination with independent stitch-forming mechanisms, comprising reciprocating thread-carrying needles having working positions in relative angular disposition and adapted respectively for uniting and covering the overlapped margins of layers of fabric, of means engaging and traveling with both faces of those portions of the fabric adjacent and at one side of the stitch-line and adapted to support and advance to said uniting stitch-forming mechanism said layers of fabric face to face with the margins including the stitch-line wholly exposed for passage of the needle, and means acting upon the opposite faces of the fabric intermediate the stitch-forming and work-advancing mechanisms for opening out the margins and body of the fabric adjacent the uniting seam preparatory to the action of the covering stitch-forming mechanism.

4. In a sewing machine, the combination with two spaced feeding devices, having work-engaging faces in relative angular disposition and a common direction of feed, and independent operating means for said feeding devices, with means for adjusting their relative feeding action, of independent stitch-forming mechanisms comprising reciprocating thread-carrying needles having angularly disposed working positions and adapted for producing seams of different character, the one overlying the other and arranged to operate each in conjunction with a different one of said feeding devices.

5. In a sewing machine, the combination with a frame comprising a work-supporting member and an overhanging bracket-arm, and independent stitch-forming mechanisms mounted in said frame and adapted respectively for uniting and covering the overlapped margins of layers of fabric, of two spaced feeding devices arranged in alinement and having a common direction of feed and each being adapted to coöperate with one of said stitch-forming mechanisms, the forward feeding device being sustained by the bracket-arm and the other feeding device by the work-supporting member of the frame, and means for actuating said feeding devices.

6. In a sewing machine, the combination with independent stitch-forming mechanisms adapted respectively for uniting and covering the overlapped margins of layers of fabric, of spaced work-engaging members operating independently in supporting and feeding the fabric in conjunction with the respective stitch-forming mechanisms and affording an intermediate clearance space for introduction of the fabric between the same in order to permit the use of the machine for a single stitching operation when desired.

7. In a sewing machine, the combination with suitable feeding mechanism, of independent stitch-forming mechanisms adapted respectively for uniting and covering the overlapped margins of layers of fabric, the covering stitch-forming mechanism comprising two reciprocating and laterally moving needles and two loop-takers having fixed working positions and each coöperating with a different needle in the production of successive stitches.

8. In a sewing machine, the combination with suitable feeding mechanism, of independent stitch-forming mechanisms adapted respectively for uniting and covering the overlapped margins of layers of fabric, the covering stitch-forming mechanism comprising two reciprocating and laterally moving needles with actuating means therefor causing them to exchange working positions in the production of successive stitches, and loop-takers disposed in fixed working positions and adapted to coöperate alternately with each of said needles in the production of stitches.

9. In a sewing machine, the combination with suitable feeding mechanism, of independent stitch-forming mechanisms adapted respectively for uniting and covering the overlapped margins of layers of fabric, the covering stitch-forming mechanism comprising two reciprocating and laterally moving needles with actuating means therefor causing them to exchange working positions in the production of successive stitches, and loop-takers disposed in fixed working-positions and having operative movements in the direction of feed and adapted to coöperate alternately with each of said needles in the production of stitches.

10. In a sewing machine, the combination with a frame comprising a work-supporting member and an overhanging bracket-arm, and a longitudinally disposed main-shaft journaled in said bracket-arm, of stitch-forming mechanisms adapted for uniting and covering the overlapped margins of layers of fabric and comprising thread-carrying needles having working positions in relative angular arrangement, carriers for said needles supported by and movable in respect of said bracket-arm, and coöperating loop-taking members carried by said bracket-arm and work-supporting member, respectively, independent actuating means for said needles connected with the forward end of said main-shaft, and feeding mechanism for advancing the work for the successive action of said stitch-forming mechanisms.

11. In a sewing machine, the combination with two stitch-forming mechanisms comprising reciprocating needles moving respectively in horizontal and vertical planes, and complemental loop-taking devices coöperating with the same, of a pair of horizontally disposed feed-wheels for supporting and presenting the fabric to the first-named stitch-forming mechanism in vertical arrangement, and a reciprocating feed-dog with horizontal feeding surface acting in conjunction with the second-named stitch-forming mechanism upon the fabric presented to the latter in horizontal arrangement.

12. In a sewing machine, the combination with the frame comprising a work-supporting member and an overhanging bracket-arm, and independent stitch-forming mechanisms adapted respectively for uniting and covering the overlapped edges of two pieces of fabric, of independent feeding devices adapted to operatively engage the fabric each adjacent to its respective stitch-forming mechanism, and means for carrying said feeding devices connected respectively with said work-supporting member and bracket-arm.

Signed at New York this 20th day of December 1904.

HERMANN A. KLEMM.

Witnesses:
    C. SEDGWICK,
    J. M. HOWARD.